US012632160B1

(12) United States Patent
Lance et al.

(10) Patent No.: US 12,632,160 B1
(45) Date of Patent: May 19, 2026

(54) WIDGETIZER

(71) Applicant: Advisor360, LLC, Weston, MA (US)

(72) Inventors: John Lance, Littleton, MA (US);
Andrew Baizen, Canton, MA (US)

(73) Assignee: Advisor360, LLC, Needham, MA (US)

( * ) Notice: Subject to any disclaimer, the term of this patent is extended or adjusted under 35 U.S.C. 154(b) by 547 days.

(21) Appl. No.: 18/171,959

(22) Filed: Feb. 21, 2023

Related U.S. Application Data

(60) Provisional application No. 63/311,658, filed on Feb. 18, 2022.

(51) Int. Cl.
| | |
|---|---|
| *G06F 3/048* | (2013.01) |
| *G06F 3/0482* | (2013.01) |
| *G06F 3/0484* | (2022.01) |
| *G06F 16/22* | (2019.01) |
| *G06F 16/2457* | (2019.01) |
| *G06T 11/20* | (2006.01) |

(52) U.S. Cl.
CPC .......... *G06F 3/0484* (2013.01); *G06F 3/0482* (2013.01); *G06F 16/221* (2019.01); *G06F 16/2282* (2019.01); *G06F 16/24578* (2019.01); *G06T 11/206* (2013.01); *G06T 2200/24* (2013.01)

(58) Field of Classification Search
CPC .... G06F 3/0484; G06F 3/0482; G06F 16/221; G06F 16/2282; G06F 16/24578; G06T 11/206; G06T 2200/24
See application file for complete search history.

(56) References Cited

U.S. PATENT DOCUMENTS

| | | | |
|---|---|---|---|
| 7,546,543 | B2 | 6/2009 | Louch et al. |
| 7,861,181 | B2 | 12/2010 | Kaminsky et al. |
| 8,015,502 | B2 | 9/2011 | LuVogt et al. |
| 8,595,636 | B2 | 11/2013 | Bergman et al. |
| 8,954,871 | B2 | 2/2015 | Louch et al. |
| 8,972,873 | B2 | 3/2015 | Gerken, III et al. |

(Continued)

FOREIGN PATENT DOCUMENTS

| | | |
|---|---|---|
| KR | 20100003117 A | 1/2010 |

OTHER PUBLICATIONS

Shirogane & Fukazawa, Method of User-Customizable GUI Generation and Its Evaluation, Proceedings 1998 Asia Pacific Software Engineering Conference, 1998, online at ieeexplore.ieee.org/ie14/5931/15796/00733742.pdf.

*Primary Examiner* — Aleksey Olshannikov
(74) *Attorney, Agent, or Firm* — Clocktower Law LLC; Erik J. Heels; Michael A. Bartley

(57) ABSTRACT

The Widgetizer allows a user to create a custom view from a data-driven application page and convert it into a widget that can then be surfaced elsewhere. The Widgetizer recognizes the types of data that the user is creating a widget for and leverages that information to recommend which layouts and elements make sense based on the type and importance of the data. The recommendations (both layout and default element settings) consider user behavior and update to reflect their preferences. The recommendations may further recognize preferences used by multiple peer users for similar data sets and update recommendations based on those behaviors. The user may customize the recommended elements and create a widget. Once a widget is created, it may also be shared with multiple users.

17 Claims, 7 Drawing Sheets

(56)     References Cited

U.S. PATENT DOCUMENTS

| | | | |
|---|---|---|---|
| 9,009,152 B2 | 4/2015 | Lai et al. | |
| 9,720,554 B2 | 8/2017 | Frohwein | |
| 10,922,101 B2 | 2/2021 | DiMascio et al. | |
| 11,137,904 B1 | 10/2021 | Tyler et al. | |
| 2006/0015846 A1 | 1/2006 | Fraleigh et al. | |
| 2009/0171754 A1 | 7/2009 | Kane et al. | |
| 2009/0171968 A1 | 7/2009 | Kane et al. | |
| 2009/0172021 A1 | 7/2009 | Kane et al. | |
| 2011/0066477 A1 | 3/2011 | Fujioka | |
| 2011/0225015 A1 | 9/2011 | Spivack et al. | |
| 2013/0073568 A1 | 3/2013 | Federov et al. | |
| 2015/0113451 A1* | 4/2015 | Kopp | G06F 16/242 |
| | | | 715/764 |
| 2015/0278371 A1* | 10/2015 | Anand | G06F 16/9038 |
| | | | 707/723 |
| 2016/0026695 A1* | 1/2016 | Fan | G06F 40/18 |
| | | | 707/723 |
| 2019/0108234 A1 | 4/2019 | Torres et al. | |
| 2019/0256084 A1 | 8/2019 | Lee et al. | |
| 2020/0372077 A1* | 11/2020 | Religa | G06F 40/18 |

* cited by examiner

100.

| Household Name | Household Value ($) | 1-Day Change (%) | Cash ($) | CRM Type | CRM Category | Household Assign To | Last Review Date | Last Touch Point Date |
|---|---|---|---|---|---|---|---|---|
| MARTINEZ, TOMAS & MARIA | 417,387 | 1.02 | 10,168 | Client | Tier 3 | Pat Middlebrook | 4/27/2021 | 5/27/2021 |
| WALKER, DAVID & O'NEIL, MARY | 3,694,966 | 0.63 | 81,518 | Client | Tier 1 | Tomas Martinez | 11/23/2021 | 11/23/2021 |
| BAUM, ALEX & JAMES | 247,589 | 0.54 | 22,891 | Client | Tier 3 | Pat Middlebrook | 12/5/2021 | 1/7/2022 |
| PARKEY, TYRONE | 736,869 | 0.57 | 4,664 | Client | Tier 2 | Pat Middlebrook | 10/10/2021 | 10/10/2021 |
| LEE, TRACI & TERI | 442,511 | 0.87 | 12,583 | Client | Tier 3 | Pat Middlebrook | 6/7/2021 | 11/19/2021 |
| CRAWFORD, DOUGLAS | 907,070 | 1.17 | 13,106 | Client | Tier 2 | Tomas Martinez | 5/27/2021 | 5/27/2021 |
| OSTERBERG, BROOKE | 99,280 | 0.96 | 4,291 | Prospect | Tier 4 | Tomas Martinez | 3/18/2021 | 11/23/2021 |
| GOMEZ, VALERIE | 1,703,901 | -0.05 | 12,839 | Client | Tier 1 | Pat Middlebrook | 2/7/2020 | 12/5/2021 |
| BRUCKER, CHRIS & JAYLA | 937,205 | 0.09 | 7,272 | Client | Tier 2 | Pat Middlebrook | 4/20/2021 | 10/10/2021 |
| SANOTS, GABRIELLA & DANA | 733,741 | 2.02 | 33,344 | Client | Tier 2 | Pat Middlebrook | 11/19/2021 | 11/22/2021 |

FIG. 2

| ID | Field Name | 300 Data Type | 310 Data Type Count | 320 Column Position | 330 Column Position Weighting | 340 Sort Weighting | 350 Filters Weighting | 360 User Pref. Weighting | 370 All Users Weighting | 380 Total Rank / Weighting |
|----|------------|---------------|---------------------|---------------------|-------------------------------|--------------------|-----------------------|--------------------------|-------------------------|----------------------------|
| A | Household Name | Unique Text | 349 | 1 | 5 | 2 | 0 | 1 | 1 | 9 |
| B | HH Value | Unique Currency | 349 | 2 | 4 | 3 | 0 | 1 | 1 | 9 |
| C | 1-day change | Unique Percentage | 349 | 3 | 4 | 0 | 0 | 0 | 1 | 5 |
| D | Cash | Unique Currency | 349 | 4 | 3 | 1 | 0 | 1 | 1 | 6 |
| E | Formal Name | Unique Text | 349 | 5 | 3 | 0 | 0 | 0 | 0 | 3 |
| F | Name for Salutation | Unique Text | 349 | 6 | 2 | 0 | 0 | 0 | 0 | 2 |
| G | CRM Type | Category | 4 | 7 | 2 | 1 | 0 | 0 | 0 | 3 |
| H | CRM Category | Category | 4 | 8 | 2 | 1 | 0 | 1 | 1 | 5 |
| I | Client Start Date | Date/Time | Range? | 9 | 1 | 1 | 0 | 0 | 0 | 2 |
| J | Household Assigned To | Category | 3 | 10 | 1 | 0 | 0 | 0 | 1 | 2 |

FIG. 3

Figure 4:
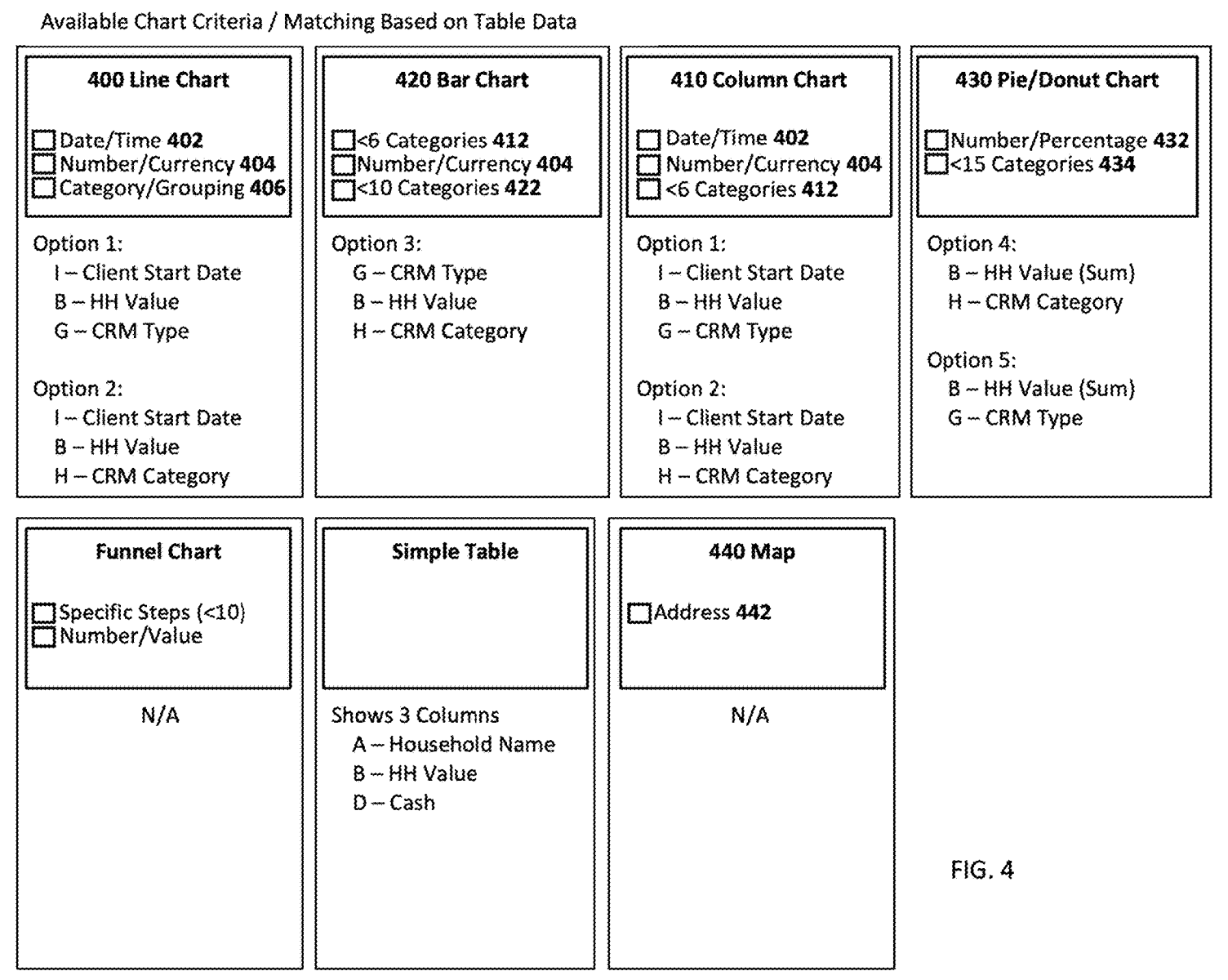

Available Chart Criteria / Matching Based on Table Data

400 Line Chart

☐ Date/Time 402
☐ Number/Currency 404
☐ Category/Grouping 406

Option 1:
 I — Client Start Date
 B — HH Value
 G — CRM Type

Option 2:
 I — Client Start Date
 B — HH Value
 H — CRM Category

420 Bar Chart

☐ <6 Categories 412
☐ Number/Currency 404
☐ <10 Categories 422

Option 3:
 G — CRM Type
 B — HH Value
 H — CRM Category

410 Column Chart

☐ Date/Time 402
☐ Number/Currency 404
☐ <6 Categories 412

Option 1:
 I — Client Start Date
 B — HH Value
 G — CRM Type

Option 2:
 I — Client Start Date
 B — HH Value
 H — CRM Category

430 Pie/Donut Chart

☐ Number/Percentage 432
☐ <15 Categories 434

Option 4:
 B — HH Value (Sum)
 H — CRM Category

Option 5:
 B — HH Value (Sum)
 G — CRM Type

Funnel Chart

☐ Specific Steps (<10)
☐ Number/Value

N/A

Simple Table

Shows 3 Columns
 A — Household Name
 B — HH Value
 D — Cash

440 Map

☐ Address 442

500. Most Popular Elements For The User

| 400 Line Chart | 420 Bar Chart | Column Chart |
|---|---|---|

510. Most Popular Elements For All Users

| Bar Chart | Column Chart | Stacked Column Chart |
|---|---|---|

FIG. 5

WIDGETIZER

CROSS-REFERENCE TO RELATED APPLICATIONS

This utility patent application claims priority from U.S. provisional patent application Ser. No. 63/311,658, filed Feb. 18, 2022, titled "Widgetizer", naming inventors John Lance and Andrew Baizen.

COPYRIGHT NOTICE

BACKGROUND

Field of Technology

This relates to optimizing large sets of data for presentation purposes, typically into smaller presentations, and more specifically to creating software widgets for display of data with a recommendation of possible element layouts.

Background

Widgets have long been used in software to present data. Predefined widgets, such as those through widgetbox.app, can be added to an application or webpage. Application or website specific widgets may be predefined with settings that can be enabled or disabled. Widget-like components may point to different data sources, and surface information in a predefined format such as Jira gadgets. Basic charts may be recommended for visualizing data from spreadsheets such as Excel.

DESCRIPTION OF PRIOR ART

U.S. Patents

U.S. Pat. No. 8,972,873 ("Multi-environment widget assembly, generation, and operation", issued Mar. 3, 2015, naming inventors Gerken, Ill et al.) discloses, in the Abstract, "Widget creation, editing, augmentation, tracking and deployment is provided. Embodiments may include a Widget Assembly Application ("WAA"). The WAA may employ generalized widget templates selected by a user for customizing or assembling widgets. A generator may render previously assembled widgets when requested. The generator may use a skeleton specific to the target server type and widget, and code supporting the generator and the WAA may employ recursive eye-catcher syntax. Widgets may be deployed from any discovered instance to additional remote widget containers of the same or different type." The teachings include a UI that allows for the creation of a widget that contains smaller, configurable parts.

U.S. Pat. No. 10,712,894 ("Method and apparatus to operate different widgets from a single widget controller", issued Jul. 14, 2020, naming inventor Frohwein) discloses, in the Abstract, "A method, apparatus, and computer readable storage to manage and display mini Graphical User Interface (GUI) applications, or widgets. A widget controller can be associated with a plurality of widgets, upon which a user of the widget controller can then cycle among the associated widgets to display a selected widget. This conserves space on an output device since space for only one widget is needed. Widgets controllers can be embedded on web pages which are part of social networking sites. Particular widgets associated with a widget controller can be automatically determined and associated based on content of a web page containing the widget controller." The teachings include allowing multiple widgets to share the same container and allowing the user to navigate between them.

U.S. Pat. No. 7,865,532 ("Customizing widget draw styles", issued Jan. 4, 2011, naming inventors Drukman et al.) discloses, in the Abstract, "Techniques for customizing draw styles of widgets to better accommodate a user's direct manipulation needs. A user can customize various attributes of a widget and its manipulators to suit the user's needs. The customizations are stored as a style. The stored style can subsequently be applied to the widget to control the appearance and behavior of the widget. Stored styles may be applied to other widgets and can also be shared between users." The teachings include a focus on defining the look and feel of the widget (e.g. colors).

U.S. Pat. No. 8,881,052 ("Methods and systems for managing widgets through a widget dock user interface", issued Nov. 4, 2014, naming inventors Strauss et al.) discloses, in the Abstract, "Methods, systems and computer readable media defining computer instructions for rendering a user interface (UI) are provided. The UI is defined for handling a widget that provides functionality to a displayable and executable mini-application. The widget includes a plurality of widget attributes, including a dock tile that is defined to display only selected ones of the plurality of widget attributes of the widget. Also provided is a widget dock to display and contain the dock tile on a display screen, and the dock tile is linked by a functional association to the widget. The widget dock provides access to launch the widget when selection of the dock tile is detected, so as to provide full interface with the plurality of widget attributes of the widget." The teachings focus on a dock that stores widgets and from which a widget can be dragged onto the dashboard.

U.S. Pat. No. 10,558,963 ("Shareable widget interface to mobile wallet functions", issued Feb. 11, 2020, naming inventors Desai et al.) discloses, in the Abstract, "Configuring a shareable widget interface to mobile wallet functions includes disposing a wallet module in a memory of a client device, and disposing a wallet companion applet in a secure element accessible by the client device, wherein the wallet companion applet facilitates access by at least one other applet and at least one wallet module to content that is stored in the secure element via a mobile wallet function sharable interface." The teachings focus on a mobile wallet widget.

U.S. Pat. No. 10,096,022 ("Dynamic widget generator apparatuses, methods and systems", issued Oct. 9, 2018, naming inventor Gupta) discloses, in the Abstract, "The DYNAMIC WIDGET GENERATOR APPARATUSES, METHODS AND SYSTEMS ('DWG') transforms developer credentials, codes and parameter inputs via DWG components into buy widgets, payment acceptance and purchase transaction outputs. In one embodiment, the DWG may facilitate obtaining a plurality of authentication parameters and widget customization parameters. The DWG may authenticate a user using a parameter derived from the plurality of authentication parameters and may dynamically generating a purchase widget for the authenticated user using the plurality of widget customization parameters." The teachings focus on integrating a payment widget into a web site and allowing for customers to easily buy products.

U.S. Pat. No. 8,413,055 ("Methods and systems for customizing and embedding widgets in instant messages", issued Apr. 2, 2013, naming inventors Yuen et al.) discloses, in the Abstract, "An enhanced instant messaging environment is provided where end user can choose from a list of customizable widgets, personalize and embed the widgets within messages in minimal steps. By allowing the embedment of widgets in messages, the environment empowers users with new means for online communication with new level of widget intelligence that takes into account multi-dimensional criteria, including but not limited to the screen-estate of its presentation and role of viewer for information presentation and operation options." The teachings include embedding widgets in an instant messaging experience.

U.S. Pat. No. 11,137,904 ("Devices, methods, and graphical user interfaces for interacting with user interface objects corresponding to applications", issued Oct. 5, 2021, naming inventors Tyler et al.) discloses, in the Abstract, "While displaying a first page of a home screen user interface in a first reconfiguration mode, the computer system detects a first input that corresponds to a request to enter a second reconfiguration mode, where the availability of pages in the home screen user interface can be changed in accordance with user inputs in the second reconfiguration mode. The computer system displays respective representations of at least two of the plurality of pages of the home screen user interface in the second reconfiguration mode. While displaying the second reconfiguration mode, the computer system detects a second input. If the second input is directed to a second representation of a second page that is displayed in the second reconfiguration mode, and the second input meets first criteria, the computer system displays the second page of the home screen user interface in the first reconfiguration mode."

U.S. Pat. No. 8,015,502 ("Devices, methods, and graphical user interfaces for interacting with user interface objects corresponding to applications", issued Sep. 6, 2011, naming inventors LuVogt et al.) discloses, in the Abstract, "The present invention is directed towards systems and methods for providing dynamic search results based upon historical data through the use of one or more widgets. The method of the present invention comprises receiving a request for content from a client and generating one or more widgets for providing search result content. A display profile is applied to the one or more widgets and the one or more widgets are combined with static search results to form a search result page that is provided to a requesting client."

U.S. Patent Application Publications

United States Patent Application Publication 2009/0158180 ("System and method of styling an embedded widget", published Jun. 18, 2009, naming inventors Magnani et al.) discloses, in the Abstract, "An inline-customizable widget receives an indication from a user that he would like to customize the widget, offers the user various customization options, and ultimately provides the user with a customized widget (per the user's settings) to be embedded in a web page of the user's choice, as facilitated by the widget itself; every step in the customization process takes place within the widget itself and the user need not edit any widget code or visit any web page separate from the web page in which the widget is originally found." The teachings focus on making a copy of a widget and placing it on a second web page.

United States Patent Application Publication 2011/0066477 ("Device and method for creating, distributing, managing and monetizing widgets using templates", published Mar. 17, 2011, naming inventor Fujioka) discloses, in the Abstract, "A computerized device, system and method for creating a widget. The device system and method may include creating a widget, including a widgetized existing code element, wherein creating the widget includes the use of at least one template widget, distributing the created widget, and reporting and tracking the distributed widget. The reporting and tracking the distributed widget may include at least one use via analytics of the distributed widget. The method, device and system may further include monetizing the widget to generate revenue based on the creating, and distributing."

United States Patent Application Publication 2019/0108234 ("Online widget recommendation system and method", published Apr. 11, 2019, naming inventors TORRES et al.) discloses, in the Abstract, "A widget recommendation system and method recommends user interface widgets for an event that contains content or a presentation. In one embodiment, the system recommends user interface widgets for a landing page for the content or presentation of an event. The system and method may extract features from past events and recommend the user interface widgets."

None of the above provides a widget creation tool that (1) accounts for data present at the time of creation, (2) prioritizes data based on importance, (3) accounts for user interaction with the data, (4) accounts for user history in widget creation, and (5) recommends and automates widget layout. What is needed, therefore, is a widget creation tool that overcomes the above-mentioned limitations and that includes the features enumerated above.

BRIEF SUMMARY

In many data-driven software applications, users can create views of data (typically tables) by selecting which data points they want to see and apply filters and reorder columns as needed. For example, a view of households that have above a certain net worth, or a list of A clients. However, these views are generally only available on the page on which they are created. The Widgetizer allows a user to take a view that they have created and convert it into a widget that can then be surfaced elsewhere in the application, for example on a dashboard when the application opens. This widget can summarize and show trends in the data points through recommended layouts and elements, such as charts and other visualizations. In addition, users can customize those elements.

The Widgetizer recognizes the types of data that the user is creating a widget for and leverages that information to recommend which layouts and elements make sense. The Widgetizer considers the type and the importance of the data. For example, a table may list transactions over a series of dates with amounts. In this case a graph of amounts over time may be appropriate. If, on the other hand, the table only contains names, addresses, and phone numbers, graphs would not be appropriate but instead some sort of map and table element would be more useful.

The recommendations (both layout and default element settings) consider user behavior and update to reflect their preferences (for example, if a user always deletes the graph element from their widgets and only uses tables, after a certain number of times the recommendation will stop including graphs). The recommendations may further recognize preferences used by multiple peer users for similar data sets and update recommendations based on those behaviors.

Once a widget is created, it may also be shared with multiple users.

Features and Advantages

The Widgetizer takes the data into account when the widget is being created.

The Widgetizer recommends layouts and elements that are suitable for the source data.

The Widgetizer learns user preferences and takes those into account when offering recommendations.

BRIEF DESCRIPTION OF THE DRAWINGS

In the drawings, closely related figures and items have the same number but different alphabetic suffixes. Processes, states, statuses, and databases are named for their respective functions.

FIG. 2 is an example chart of data used in creating a widget.

FIG. 3 is a chart illustrating example weighting of data columns from FIG. 2, as part of the Widgetizer recommendation engine.

FIG. 4 is an illustration of different widget elements which may recommended for display, based on the weightings from FIG. 3.

FIG. 5 is an illustration of different widget elements which may be recommended based on single or multiple user preferences.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Operation

The Widgetizer is a software program executed on a computing device, such as a desktop computer, laptop computer, tablet, or smartphone. The Widgetizer may be operated as a software module within an application, or as a separate application. The computing device executing the Widgetizer may also be one or more servers executing software displayed on a user's computer or thin client. The Widgetizer operates on top of an application displaying data. As referred to herein, the application displaying data is discussed as displaying data from a table as generated from a relational database, but the table may come from any data supplying source, such as file feeds (FTP/SFTP), text files, spreadsheets, data warehouse/warehub (i.e. Snowflake), API exchanges, non-relational data bases (key-value/object oriented), mobile devices, document OCR, and any other electronic or image based system providing data that can be represented as a table. The widgetizer ingestion function supports multiple formats from these feeds such as native file formats (.DOC/.XLS/.PDF), common exchange formats (XML/JSON), or database exchange formats. The Widgetizer also has access to storage, such as file storage or a database, into which the Widgetizer may store and retrieve user preferences, including past actions in configuring and creating widgets.

To use the Widgetizer, a user starts on a page, within a software application, that contains data that they would like to see presented in a widget and made available elsewhere in the system, for example, as a widget on the Desktop. They initiate the Widget Creation.

Figure 1:
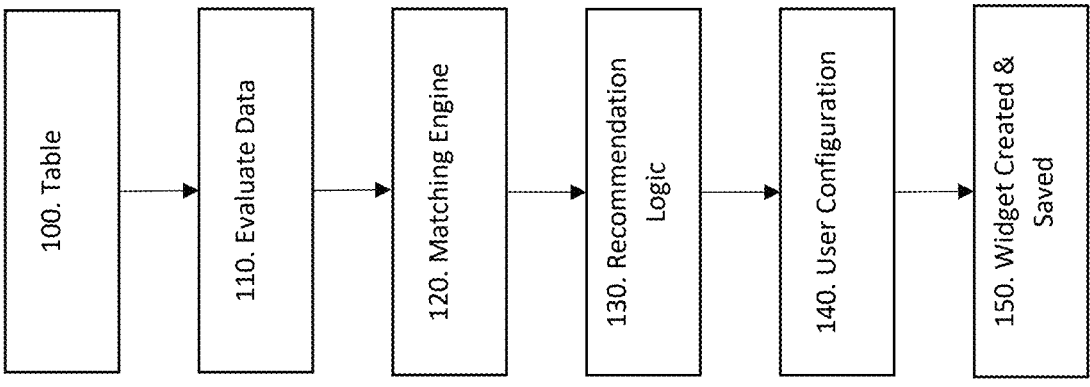
FIG. 1 is a flowchart illustrative the Widgetizer widget creation process.

Referring to FIGS. 1 & 2, a user initiates the widget creation process by launching the Widgetizer while on a user interface screen displaying data from a table 100, such as the example table illustrated in FIG. 2. The Widgetizer may be launched in any typical manner of launching a software module, such as through a button or link within the user interface screen, through a specific key sequence, or through launching a separate application. The Widgetizer requires access to the table being displayed by the application displaying data, including the data and underlying data types. These may be provided as inputs on execution of the Widgetizer software, such as by providing a specific query to a specific database used to generate a currently displayed table, along with any sorts, filters, groupings, or other selections applied within the displayed data.

Referring also to FIG. 3, the Widgetizer evaluates the data in the table to identify the most important data.

All data in a table has a data type 300, which indicates what type of information is presented in each column. Some data types are unique for each row of information. For example, Household Value has a data type of unique currency, indicating that each household as its own value for this data element. Data types can also span multiple rows. For example, CRM Type may be shared by multiple households, where some households are A level, and some households are B level. The Widgetizer keeps a count 310 for each Data Type. For example, there may be 349 Household Values (one for each household) but only 4 CRM Types (i.e. each household falls into one of the four groupings).

During data evaluation 110, the Widgetizer applies different weights to the data to identify the information of most interest. Different weighting scenarios may be applied. For example, the Widgetizer may treat column order 320 as indication of priority, and weight columns against each other based on column order. This may be accomplished by assigning column weights 330 in descending order from the left most column to the right most column. If any sorting was applied when displaying the data in the user interface screen, the Widgetizer may assign a sort weight 340 to indicate importance of the sort. As tables may be sorted multiple times (such as first sorting by household name, and then by household value), different sort weights may be assigned, such as to give the most recent sort the highest weighting. In addition to sorting, users can filter data by one or more columns. If such filtering has occurred, the Widgetizer may assign filter weights 350 to those columns to indicate interest in the filtered columns.

Data weighting can be further enhanced by factoring user preference, both for individual users and when considering multiple user. The Widgetizer may track when users add or remove data fields to created widgets. For example, if the user has previously manually added a data field to a widget, the user's preference weight 360 for the column matching that data field may be increased. The weight increase may be based on how often the data field was added to a widget when available vs not. For example, if a user 100% of the time adds "Name" to their widgets, then the Name data field may be weighted highly. If, however, they add Name only once out of the twenty times it was available, the weight will be increased fractionally. Similarly, if the user has previously manually removed a data field when it was automatically included in a widget, the weight of the data field may be decreased, and the amount of decrease may be based on the frequency with which the data field was removed. If all preference weights default to 0, this may result in a negative weighting for data fields frequently removed.

Similar to weighting preferences for an individual user, tracking actions from multiple users adding or removing data fields may produce weights 370 for multiple user preferences. The range of weights for multiple user preferences may be limited to less than the range for individual user preference weights, allowing for the individual user weighting to be more significant.

The Widgetizer may sum the determined weights to determine a total rank or weighting 380 for each column.

Referring also to FIG. 4, after evaluating the data, the Widgetizer executes a Matching Engine 120 that identifies which elements (Charts, Tables, or Special) can be used to present the data in the widget. Each element may be pre-configured in the Widgetizer to require certain data type combinations. For example, a line chart 400 may require a column with dates or times 402, a column with numbers or currency 404, and a column of category or grouping data 406. A column chart 410 may require a column with dates or times 402, a column with numbers or currency 404, and a column with six or fewer different categories or groupings 412. A bar chart 420 may require a column with numbers or currency 404, a column with less than ten categories or groupings 422, and another column with less than six categories or groupings 412. A pie chart 430 may require a column with numbers, currency, or percentage 432, and a column with less than fifteen categories or groupings 434. Special elements may also have requirements, such as requiring an address column 442 for a map element 440. Additional data presentation elements and their specific data type requirements may be pre-configured in the Widgetizer.

To identify which charts to recommend, the Matching Engine evaluates the data columns with the greatest weights to determine if a chart can be derived from that information. If a chart cannot be created based on the most highly weighted data columns, then the engine may drop the lowest ranked data column and look at the next highest ranked data to determine if a chart can be created. The matching engine may loop through the data until a pre-configured number of charts are identified (e.g., 3) or the engine determines that no charts can be created from the data. In some cases, different types of charts may be created using the same data, e.g., line and bar graphs both use the same data.

In addition to identifying charts to recommend, the Widgetizer may determine whether a table can be used as an element of the widget. Tables may be optimized to show the most important data in the table. This optimization uses the columns having the greatest weight, may be limited to a pre-configured number of columns (e.g., 3) to avoid exceeding an optimal widget width, and may have a minimum number of columns required (e.g., 2). The amount of data (number of rows) may also be limited to a pre-configured maximum (e.g., a maximum of 10 rows). Any configurations in the base table, including filters, sorts, and groupings, may be retained and applied within the widget table. The configurations may be retained even if they apply to a column not displayed in the widget table.

The Widgetizer may also determine if a Special Element can be used. Special Elements present information based on data, but not in a chart or table form. Some specific data types may lend themselves to specialized visual presentations, and Special Elements may be pre-configured within the Widgetizer for such presentation. For example, a Map element may be included in a widget if an address data type is present.

Referring also to FIG. 5, after determining which elements can be included in the widget, the Widgetizer executes Recommendation Logic 130 to determine which elements to recommend the user include in the widget. The recommendations rank possible elements based on which elements show the highest weighted data, and then adjusts the ranking based on user preferences 500. In addition to tracking which data fields users add or remove from display within widgets, the Widgetizer may track user history for types of charts and other elements included in widgets. For example, if the user typically chooses a line chart 400 over a bar chart 420, then the line chart options may be recommended ahead of any line chart recommendations. The weight of specific element types may be increased (or decreased) based on the frequency the user adds (or removes) a specific element type from created widgets.

In cases where multiple users are creating widgets, other users' element preferences 510 may also be tracked and factored in the recommendation weights. However, the increase/decrease weighting may be restricted to be less significant than weighting from the individual user's personal preferences.

Figure 6:
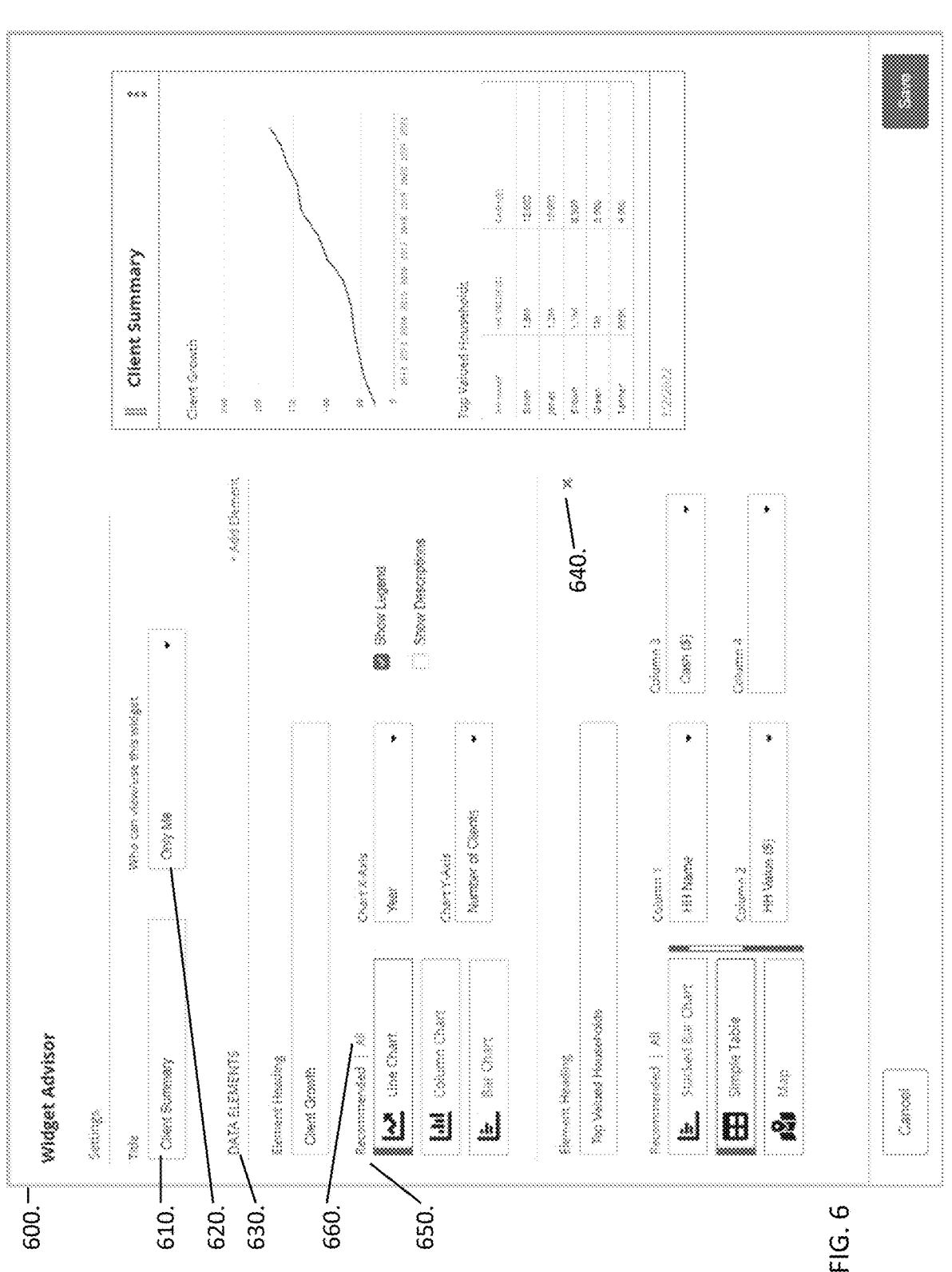
FIG. 6 is a screenshot of a recommendation interface the Widgetizer presents to the user creating a widget.

Referring also to FIG. 6, the Widgetizer presents the recommended elements and layouts to the user within a widget customization user interface screen 600. Within this user interface screen, the user can customize or configure 140 different aspects of the widget. The user may assign a name or title 610 to the widget. The user may allow other users 620 to use the widget. The sharing mechanism may be configured for specific individuals or groups. The users being shared with must either have access to the data being presented in the widget or access to similar data. For example, a first user creates a widget that shows the clients associated with their login. They share the widget with a second user. The second user will see the created widget populated with data from the clients associated with the second user's login.

The user can rearrange or move data elements 630, such as moving one element above another element. The user can remove elements, such as clicking the "x" 640 to remove the "Top Valued Households" table.

The user may configure settings for individual elements. Available settings are specific for elements, and preconfigured for each element type within the Widgetizer. For example, a table element may include configurable settings allowing a user to pick columns to show within the table, while limiting the maximum number of columns to ensure usability.

The user may choose to add elements. By default, the Widgetizer may include a top-recommended element, and display additional elements 650 highly ranked by the Recommendation Logic. The user may select among the recommended elements (such as choosing to replace a line chart with a bar chart), or choose from all available elements 660 that were not originally recommended (such as choosing to replace the line chart with a pie chart). The elements available for selection are limited to those determined to be included based on the data/context from which the widget builder was launched (e.g., selecting a Map element is only available if there are addresses in the data table).

The system tracks the changes the user makes while customizing the widget, both in selecting elements to include or remove and also in configuring specific elements. These changes affect the weights applied by the Matching Engine or Recommendation Logic during future widget recommendations made to the user and other users.

Figure 7:
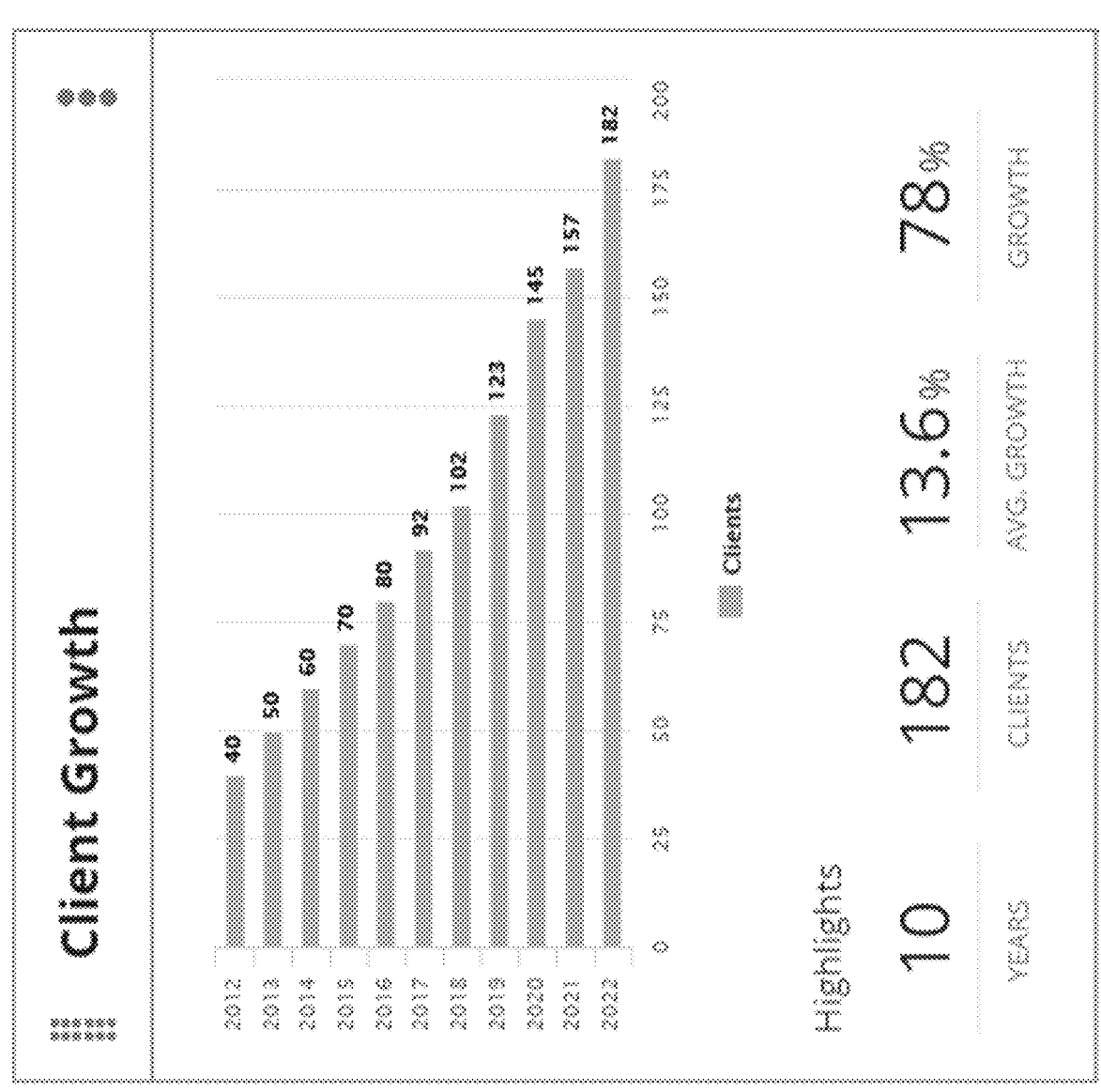
FIG. 7 is a screenshot of an example widget created by the Widgetizer.

Referring also to FIG. 7, when the user saves 150 the widget 700 the final layout is published and can be shared/ accessed by other users if the user selected that option.

Other Embodiments

In alternate embodiments, different weightings and heuristics generating rankings based on the weightings may be applied during by the Matching Engine and Recommendation Logic. These may be preconfigured in the Widgetizer, or may be configured by an authorized user, such as through settings in a configuration file.

In an alternate embodiment may include Summary elements that can calculate totals, percentages, and other information based on the original data even if those values are not already present in the table/source.

The alternate embodiments may be practiced separately or in any combination with the preferred embodiment.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A method for creating software widgets, comprising:
launching a widget creation software interface on top of a software application displaying a data-driven screen with data displayed on the data-driven screen; and
executing software code, stored in a non-transitory medium, of the widget creation software interface that:
recognizes data displayed on the data-driven screen and accesses the data as organized within columns of a table;
evaluates the accessed data and identifies data of most interest by:
identifying a data type for each column;
updating a data count for each data type;
applying one or more weights to each column including:
assigning each column a column weight in a descending order from left to right based on a presentation order of data displayed on the data-driven screen;
assigning a sort weight to each column based on any sorting applied to data displayed on the data-driven screen such that a greatest sort weight applies to a most recent sort applied;
assigning a filter weight to each column prioritizing columns filtered to display on the data-driven screen;
assigning a user preference weight to each column based on a user history of adding or removing data of that column to one or more previously created widgets, and increasing the user preference weight based on a frequency that the column is added to the one or more previously created widgets, and decreasing the user preference weight based on a frequency that the column is removed from the one or more previously created widgets; and
assigning a multi-user preference weight to each column based on data of that column being removed or added to one or more previous widgets created by other users, and limiting the multi-user preference weight a range having less significance than a range of the user preference weight; and
determining a total rank for each column based on a sum of weights assigned to that column;
determines, through a matching engine, possible widget elements based on identified data, wherein each possible widget element is one of a chart element, a table element, or a special element, and each widget element is preconfigured to require one or more specific data types, and widget elements with required data types matching data types of columns are possible widget elements, by:
considering data types of columns in descending order of greatest total rank to determine if the data types of the columns of greatest rank match a chart element's preconfigured requirements;
looping the consideration by removing one or the greatest total rank columns and considering a lower total rank column until a preconfigured number of chart elements are matched, or no further column combinations are available to consider; and
evaluating data from columns in order of greatest total rank to identify inclusion of a possible table element while:
limiting the table element to a preconfigured number of columns;
limiting the table element to a minimum number of columns;
limiting the table element to a preconfigured maximum number of rows; and
retaining any filter, sort, and grouping configurations from data displayed on the data-driven screen and applies the same filter, sort, and grouping configurations to the table element;
executes recommendation logic and ranks determined possible widget elements based on which possible widget elements include the greatest sum of total rank from columns included in each possible widget element;
adjusts the possible widget element ranking based on a frequency within the user history that the possible widget element has been added or removed from the one or more previously created widgets, and further adjusts the possible widget element ranking based one or more other users adding or removing the possible widget element from the one or more previous widgets created by other users while restricting the further adjustment to be less significant than adjustment based on the user history;
presents, within a widget customization screen, top ranked determined possible widget elements as recommended elements, next highest ranked possible widget elements as additional selectable options, and an option to select from all possible widget elements;
accepts user input of widget customization within the widget customization screen;
saves a created widget; and publishes the created widget for display on other software application screens.

2. A method for creating software widgets, comprising:

launching a widget creation software interface on top of a software application displaying a data-driven screen with data displayed on the data-driven screen; and executing software code, stored in a non-transitory medium, of the widget creation software interface that:

recognizes and accesses data displayed on the data-driven screen as organized within columns of a table;

evaluates the accessed data and identifies data of most interest by:

identifying one or more data types within the accessed data:

updating a data count for each data type; and applying a column weight, a sort weight, a filter weight, a users preference weight, and a multi-user preference weight to each column of the table while identifying data of most interest by:

assigning one or more column weights to the accessed data in a descending order from left to right based on a presentation order of data displayed on the data-driven screen;

assigning one or more sort weights to any sorting applied to data displayed on the data-driven screen;

assigning one or more filter weights prioritizing any columns of data filtered to display on the data-driven screen;

assigning one or more users preference weights based on a user history of adding or removing data from one or more previously created widgets; and assigning one or more multi-user preference weights based on data being removed or added to one or more previous widgets created by other users;

determines, through a matching engine, possible widget elements based on identified data;

executes recommendation logic and ranks determined possible widget elements;

presents, within a widget customization screen, top ranked determined possible widget elements as recommended elements;

accepts user input of widget customization within the widget customization screen;

saves a created widget; and publishes the created widget for display on other software application screens.

3. The method of claim 2, wherein assigning one or more sort weights further comprises applying a greatest weighting to a most recent sort when multiple sorts apply to data displayed on the data-driven screen.

4. The method of claim 2, wherein assigning one or more user preference weights further comprises increasing the user preference weight for a column added to the one or more previously created widgets, and decreasing the user preference weight for a column removed from the one or more previously created widgets.

5. The method of claim 4, wherein assigning one or more user preference weights further comprises increasing the user preference weight for added columns based on a frequency of adding those columns to previously created widgets, and decreasing the user preference weight for removed columns based on a frequency of removing those columns from previously created widgets.

6. The method of claim 2, wherein assigning one or more multi-user preference weights is further limited to a weight range having less significance than a user preference weight range.

7. The method of claim 2, wherein evaluates and identifies data further comprises determining a total rank for each column based on the applied weights.

8. The method of claim 7, wherein determining a total rank further comprises ranking columns based on a sum of weights assigned to each column.

9. The method of claim 8, wherein determines possible widget elements further comprises:

evaluating one or more widget elements which are chart elements, table elements, or special elements, wherein each possible element is preconfigured to require one or more specific data types, and widget elements with required data types matching data types of columns are possible widget elements.

10. The method of claim 9, wherein determines possible widget elements further comprises:

considering data types of columns in descending order of greatest total rank to determine if the data types of the columns of greatest rank match a chart element's preconfigured requirements; and looping the consideration by removing one or the greatest total rank columns and considering a lower total rank column until a preconfigured number of chart elements are matched, or no further column combinations are available to consider.

11. The method of claim 9, wherein determines possible widget elements further comprises:

evaluating data from columns in order of greatest total rank to identify inclusion of a possible table element;

limiting the table element to a preconfigured number of columns;

limiting the table element to a minimum number of columns;

limiting the table element to a preconfigured maximum number of rows; and retaining any filter, sort, and grouping configurations from data displayed on the data-driven screen and applies the same filter, sort, and grouping configurations to the table element.

12. The method of claim 9, wherein ranks possible widget elements further comprises ranking possible widget elements based on which possible widget elements include the greatest sum of total rank from columns included in each possible widget element.

13. The method of claim 12, wherein ranks possible widget elements further comprising adjusting the ranking based on a tracked user history of adding or removing a specific element from previously created widgets.

14. The method of claim 13, wherein adjusting the ranking further comprises adjusting based on a frequency that specific element has been added or removed from previously created widgets.

15. The method of claim 13, wherein ranks possible widget elements further comprises adjusting the ranking based on a tracked history of one or more other users adding or removing the specific element from previous widgets created by other users.

16. The method of claim 15, wherein adjusting the ranking based on a tracked history of one or more other users further comprises restricting the other user adjustment to be less significant than adjustment based on the tracked user history.

17. The method of claim 2 wherein presents further comprises presenting next highest ranked possible widget elements as additional selectable options, and presenting an option to select from all possible widget elements.

* * * * *